Jan. 8, 1946.  F. J. LAPOINTE  2,392,747
PULL HEAD FOR BROACHING MACHINES
Filed Aug. 23, 1943  2 Sheets-Sheet 1
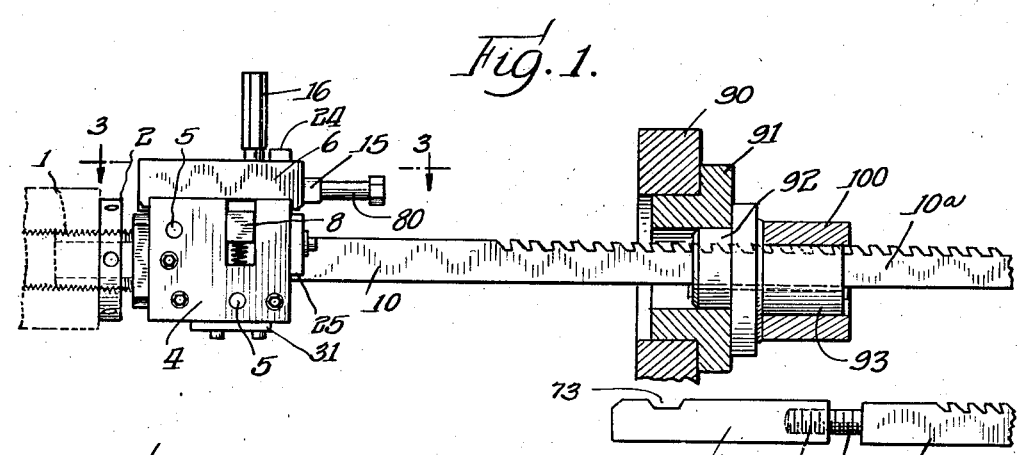
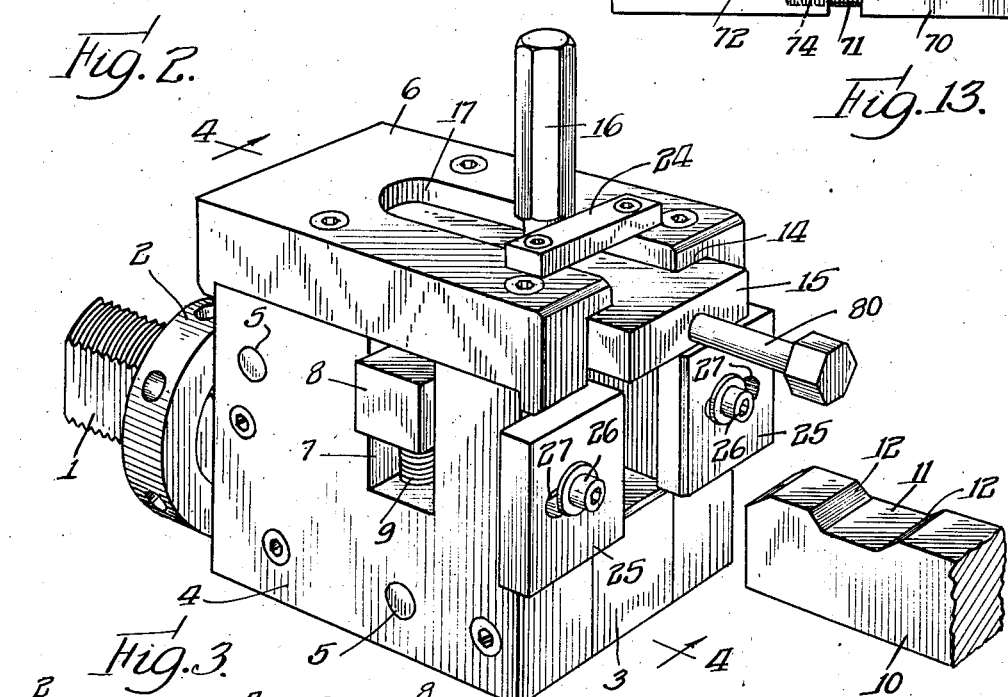
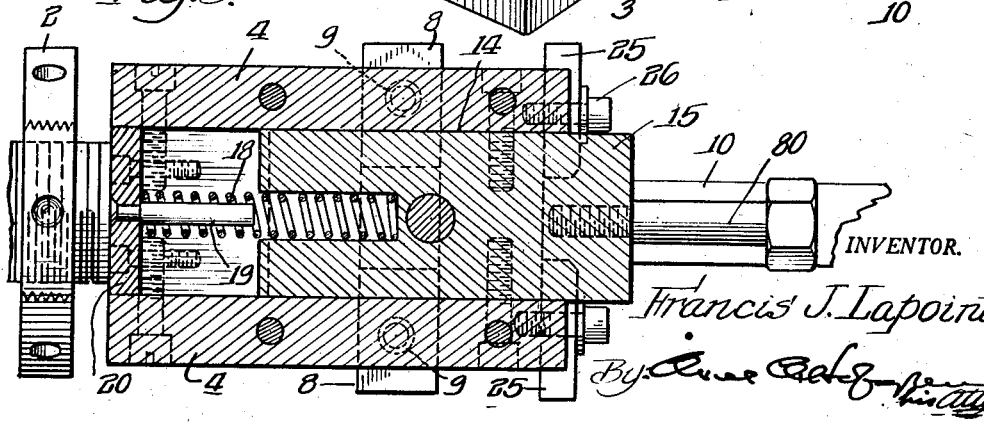
INVENTOR.
Francis J. Lapointe

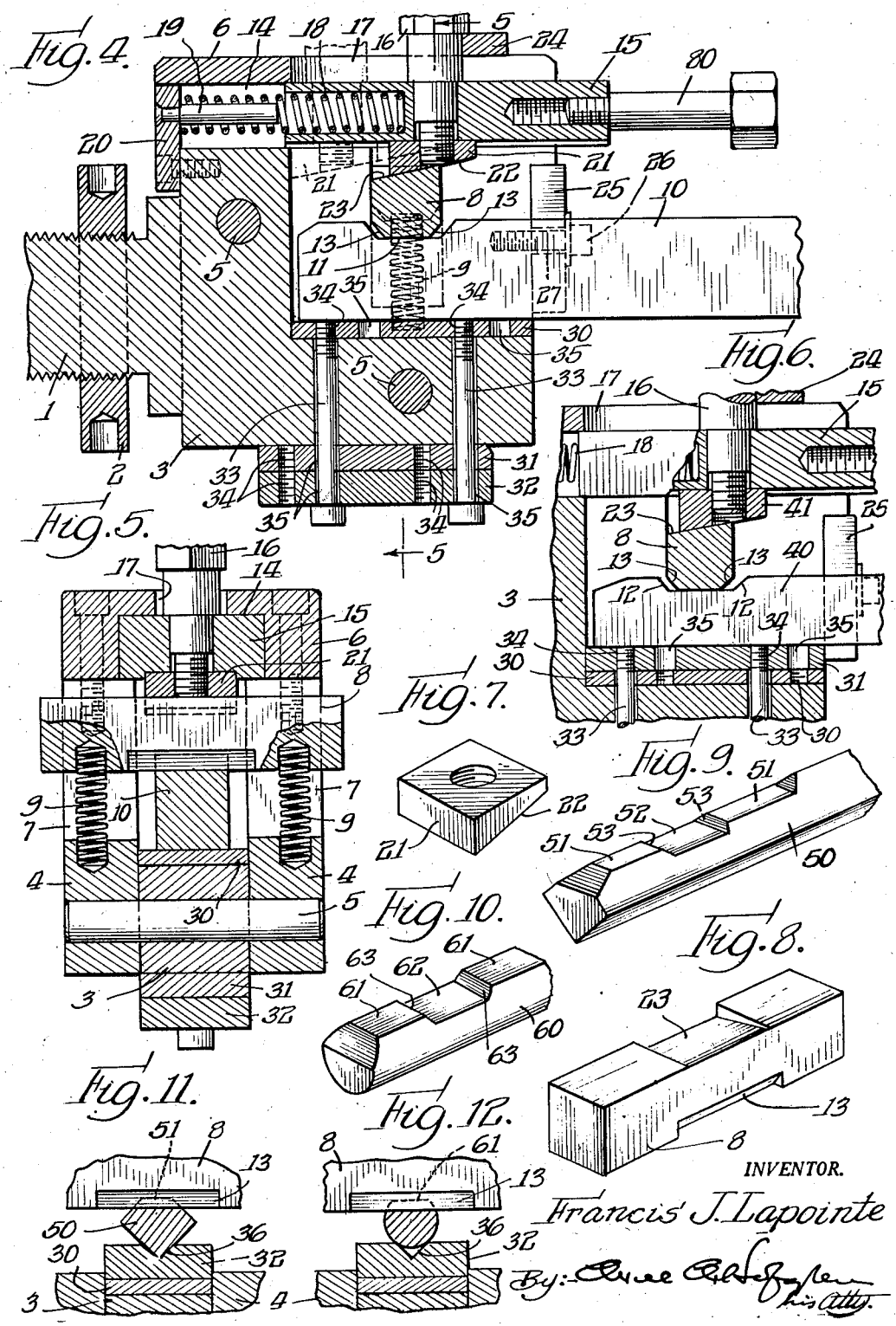

Patented Jan. 8, 1946

2,392,747

UNITED STATES PATENT OFFICE 2,392,747

PULL HEAD FOR BROACHING MACHINES

Francis J. Lapointe, Ann Arbor, Mich., assignor to American Broach & Machine Co., Ann Arbor, Mich., a corporation of Michigan Application August 23, 1943, Serial No. 499,640

20 Claims. (Cl. 90—33)

This invention relates to broaching machines and to broaches to be used therein, and it is particularly concerned with means for mounting in such a machine a type of broach having teeth disposed only at one side of its axis, as, for example, in a keyway broach, or at least with the teeth so arranged that in setting up the work it is necessary to have the broach positioned with its teeth in a certain relation to the axis of the bore in the work piece.

One object of the invention is to provide a new and improved pull head for a broaching machine.

Another object of the invention is to provide a pull head engageable with a broach having a shank of substantially the same cross section as the body of the broach with a minimum reduction of that cross section forming a notch at one side of the shank for engagement with the pull head.

A further object is to provide a pull head for a broach having cutting teeth of non-circular cross section and in which the shank of the broach is formed at only one side for engagement with the pull head, thus determining the position of the broach teeth with respect to the axis of the broach.

It is also an object of the invention to provide a pull head for a broach of non-circular cross section, having means which may be quickly operated to engage the shank of the broach or to release it, without rotating the broach about its axis.

More specifically, it is an object of the invention to provide a pull head with means for engagement with broaches of rectangular cross-section or other non-cylindrical shapes, and with means for adapting the pull head to a relatively wide range of sizes of broach shanks by simple adjustments and the use of certain interchangeable parts.

Other objects and advantages of the invention will appear from the following description taken in connection with the drawings in which:

Fig. 1 is a side elevation of a pull head showing a portion of a keyway broach secured therein in accordance with this invention.

Fig. 2 is a perspective view of the pull head on a larger scale, showing a fragment of the shank of the broach removed from the head.

Fig. 3 is a sectional view taken substantially as indicated at line 3—3 on Fig. 1.

Fig. 4 is a section at a plane substantially perpendicular to that at which Fig. 3 is taken, this section being taken as indicated at line 4—4 on Fig. 2.

Fig. 5 is a transverse section taken as indicated at line 5—5 on Fig. 4.

Fig. 6 is a detail sectional view taken at the same plane as Fig. 4, but illustrating the pull head with its operating cam block replaced by a deeper cam block to secure engagement with a broach shank of smaller cross-section.

Fig. 7 is a detail perspective view of one of the cam blocks.

Fig. 8 is a detail perspective view of the clutch bar for the pull head.

Fig. 9 is a fragmentary perspective view of a special form of broach shank which the pull head is adapted to receive.

Fig. 10 is a fragmentary perspective view of another special form of broach shank adapted to be fitted in the pull head.

Fig. 11 is a cross-section of the shank shown in Fig. 9, indicating means for holding it in the pull head.

Fig. 12 is a cross-section of the shank shown in Fig. 10, together with means adapting it for use in the pull head of this invention.

Fig. 13 is a side elevation showing a fragment of a keyway broach having a threaded shank, together with an adapter applied thereto for use in the pull head of this invention.

While I have shown in the drawings and will herein describe in detail, certain preferred embodiments of my invention, it is to be understood that I do not thereby intend to limit the invention to the specific forms disclosed, but aim to cover all modifications and alternative constructions falling within the spirit and scope of the invention as expressed in the appended claims.

Heretofore, in the construction of keyway broaches and certain other broaches of non-circular cross-section, or having teeth provided only at one or two sides of the axis, it has been customary to make the broach with a threaded shank for connection with the pull head of the broaching machine. In substantially all cases this would result in some reduction of cross-section in order to provide a cylindrical portion of the shank to be threaded. Frequently, the insertion and removal of such a broach was a slow and awkward operation, requiring the operator to handle the sharp corners and cutting edges of the broach, sometimes injuring himself in turning it about its axis for screwing it into the pull head or unscrewing it therefrom. Furthermore, in forming a threaded shank on the end of a broach bar of rectangular cross-section it has always been difficult to get the cylindrical portion exactly centered between two parallel faces of the bar. Even if this is successfully accomplished, the machining operation required to produce a threaded shank on such a broach bar is awkward, tedious and expensive.

The present invention provides an arrangement which does not require any appreciable reduction in cross-section of the shank, and which permits the shank to be quickly inserted or removed without rotation about its axis, and without any strenuous handling on the part of the operator.

As shown in the drawings, the pull head illustrating this invention includes a threaded shank 1 by which it is coupled to the ram or crosshead of a broaching machine, and this shank may carry a lock nut 2 for securing it in position. The outer end of the shank is formed to constitute a portion of the pull head body, and in the position shown in the drawings this includes the bottom wall section 3. Side walls 4, 4 are bolted to the part 3 and connected also by dowels or crosspins 5, 5. A top wall 6 is bolted to the side walls, thus forming a receiving chamber or socket of rectangular cross-section into which the shank of the broach may be inserted.

It may be understood that a pull head of this type is applicable either to a horizontally moving slide or to a vertically movable slide of a broaching machine, but since it is illustrated in the drawings in horizontal position, the various parts and features may be referred to as in the positions shown, whereas when such a pull head is mounted in a vertically movable slide, certain horizontal parts will be vertically disposed, and vice-versa. As shown in Fig. 2, the side walls 4, 4 are formed with vertical guideways 7 which engage the end portions of a horizontally disposed clutch bar 8 which floats on compression springs 9 and is vertically adjustable in the guideways 7. Any broach intended for use in this pull head is provided with a shank, such as that shown at 10 in Fig. 2, having a notch 11 in its upper face, with a flat bottom wall and with sloping adjacent walls 12, 12. The under side of the clutch bar 8 is formed to fit the notch 11 and includes beveled or sloping faces 13, 13 for engaging the inclined surfaces 12, 12, as shown in Fig. 4.

The top wall 6 of the pull head is formed with a guideway 14 in which there is mounted a slide member 15 having an operating handle 16 which projects through a clearance slot 17 in said top wall 6. A coil spring 18 is pocketed in the inner end of the slide member 15 and is maintained in position in the guideway 14 by a centering pin 19 projecting into the guideway from a cover plate 20 applied to the pull head adjacent its threaded shank 1, as seen in Fig. 4. The under face of the slide 15 carries a cam block 21 having an inclined cam face 22 which is engageable with a correspondingly inclined face 23 formed in the upper surface of the clutch bar 8. Thus, when the slide 15 is moved to its outer limit by the force of the spring 18, the cam block 21 acts as a wedge to force the clutch bar 8 downwardly into engagement with the notch 11 of the broach shank 10, this position of the parts being illustrated in Fig. 4. The outward movement of the slide 15 is limited by engagement of its handle 16 with a stop in the form of a cross-bar 24, bolted to the top wall 6 across the clearance slot 17. To release the shank 10 it is only necessary to push back the slide 15 against the force of its spring 18 to the position indicated in dotted outlines in Fig. 4, so that the springs 9, upon which the clutch bar 8 is supported, can lift the bar clear of the notch 11 and permit the shank of the broach to be withdrawn from the pull head.

It may be understood that the slide or crosshead of the broaching machine to which the shank 1 of the pull head is secured, is usually provided with means for adjusting the axis of the pull head within certain limits for proper alignment with the work on which the broach is to operate. The machine will also be provided with a suitable work support which, in most cases, will be adjustable transversely of the axis of movement of the broach so as to position the work accurately with relation thereto. The pull head itself is provided with adjustable gates or jaws 25, each secured to its outer face by means of a clamping bolt 26 inserted through a slot 27 in the gate 25 so that these members may be adjusted laterally to provide an opening substantially equal to the width of the shank 10 to properly position the shank as it is inserted between these gates or jaws 25.

The pull head is designed to accommodate shanks of various sizes, and will be adjusted to the horizontal width of the shank by shifting of the gates or jaws 25, 25. The pull head may be accommodated to shanks of different vertical dimensions in two ways. First, I provide a series of plates or shims, denoted in Fig. 4 as 30, 31 and 32. As shown, the thinnest shim 30 of the series is lodged in the bottom of the chamber of the pull head so that the shank 10 rests directly upon this shim plate 30 and is thereby correctly positioned for operative engagement by the clutch bar 8. The shim 30 is held in place by bolts 33, 33 extending through the bottom wall of the pull head, and for convenience the additional shim plates 31 and 32 are carried by these bolts. If two plates instead of one should be required in the chamber of the pull head, as shown, for example, in Fig. 6, in which the plates 30 and 31 are seen disposed under a broach shank 40 of smaller dimensions than the shank 10, then the additional plate 32 will be carried under the heads of the bolts 33, although this portion of the structure is not shown in Fig. 6. To permit this arrangement, each of the plates 30, 31 and 32 is provided with two threaded holes 34, and two larger clearance holes 35, the threaded holes 34, 34 being spaced apart by the same distance as the bolts 33, 33, and the clearance holes 35, 35 being also spaced apart by this distance but offset from the threaded holes. The uppermost shim plate will then act as a nut engaging the threaded ends of the bolts 33 while the bolts will pass through the clearance holes of the other plates.

Further adjustments to accommodate broach shanks of different dimensions are provided by supplying two or three substitute blocks for the cam block 21. Fig. 6 shows a cam block 41 replacing the block 21, and dimensioned to force the clutch bar 8 somewhat farther down, so as to cause it to engage the shank 40, which is considerably smaller than the shank 10. It will be understood that the adjustment of the gates or jaws 25, 25 and the placement of a chosen number of shim plates in the chamber of the pull head provides only an approximate positioning of the particular broach in relation to the work, and that the final adjustment will be made by means (not shown) by which the pull head may be moved transversely on the slide or crosshead of the machine or by means for similarly shifting the work support, or both.

Occasionally, a broach of unusual cross-section is employed, having teeth at only one side of the axis, or perhaps at two opposite sides, so that it is necessary to position the broach accurately in the pull head with relation to the work, to insure that the teeth shall operate at exactly the right portion of the bore therein. The shank of such a broach is illustrated at 50 in Fig. 9, as being of square cross-section, but intended to operate with one diagonal of its cross-section in a vertical plane. To accommodate such a shank, the shim plate 32 is formed with a longitudinally extending V-groove 36, in which the edge of the shank 50 may be cradled. The opposite edge of the shank 50 is shown as cut down to form flats at 51, with a notch 52 between said flats; and with sloping faces 53 at the ends of the notch for engagement with the beveled edges 13 of the clutch bar 8.

Similarly, a shank of round cross-section, as shown at 60 in Fig. 10, may be lodged in the V-groove 36 of the block 32, said shank having flats 61 cut on its opposite side, with a notch 62 between them, and with inclined faces 63, 63 for engagement with the beveled edges 13 of the clutch bar.

Fig. 13 shows a typical keyway broach 70, as heretofore constructed, with a reduced and threaded cylindrical terminal 71. For adapting such a broach for use in the pull head of the present invention I propose to supply an adapter shank 72 of rectangular cross-section, having a notch 73 to be engaged by the clutch bar 8 of the pull head, and having a threaded socket in one end, at 74, to receive the threaded terminal 71 of the broach. A series of five or six such adapter shanks may be supplied with each pull head for use with existing broaches of the old style, already in stock.

Ordinarily, at the end of the working stroke of a broach, it is necessary to remove it from the pull head so as to enter its shank through the bore of the next piece of work to be operated upon. The release of the broach shank may be accomplished automatically in some cases by providing an adjustable tappet screw 80, threaded into the outer end of the slide 15 and projecting therefrom for encounter with any suitable actuating member by which the slide 15 may be thrust to release position at the proper time in the cycle of operation. For example, in machines in which the pull head reciprocates vertically, it is common to provide a fixture below the work table or work support, which is adapted to engage the lower end of the broach and withdraw it from the pull head at the proper time. If the broach does its work on the upward stroke, it will be pulled through the work-piece upon completion of the broaching operation, and the work will then either fall away from the work support or it can be removed manually. Then, as the pull head travels downwardly in its idle stroke, the tappet screw 80 will strike the work support at the end of the downward stroke, causing the slide 15 to be pushed into the pull head in a position to release the clutch bar 8, and to allow the shank of the broach to be withdrawn from the pull head by the handling mechanism mentioned, and not herein shown. In some instances, similar mechanism may be provided for a horizontally operated broach, such as that shown in Fig. 1. The work support 90 may be understood as a rigid portion of the machine frame, and is shown provided with a bushing 91 which carries a flanged member 92, having a work-supporting horn 93 formed with a slot or guideway in which the toothed portion 10a of the broach travels, and having a partially cylindrical portion on which the work-piece 100 is supported during the broaching operation. After completion of the work, the piece 100 will be removed from the supporting horn 93, and at the end of the return stroke of the pull head the tappet screw 80 will strike the table or work support 90 and thus release the shank of the broach from the pull head, as already described, permitting the broach to be withdrawn while a new work-piece is positioned on the horn 93, through which the shank of the broach will be inserted for reengagement in the pull head.

I claim as my invention:

1. A pull head for a broaching machine having a chamber open at one end to receive a broach shank, guideways in the opposite side walls of the chamber extending transversely thereof, a clutch bar extending across the chamber with its end portions in said guideways, and means for moving said bar along the guideways for engaging or disengaging a shoulder on the broach shank.

2. A pull head for a broaching machine having a chamber open at one end to receive a broach shank, guideways in the opposite side walls of the chamber extending transversely thereof, a clutch bar extending across the chamber with its end portions in said guideways, said bar having a face inclined to the axis of the chamber, and a slide movable longitudinally in the pull head provided with an inclined cam face engageable with said face of the bar to adjust the bar along the guideways.

3. A pull head for a broaching machine having a chamber open at one end to receive the shank of a broach, said chamber having a wall which supports one side of said shank, a clutch member movable in the pull head toward and from said wall, spring means normally urging said member away from said wall, and wedge means adjustable in the pull head and operative against said clutch member to move it toward said wall and into holding engagement with the shank of the broach.

4. A pull head for a broaching machine having a chamber open at one end to receive a broach shank, said chamber having a wall which supports one side of said shank, guideways in adjacent side walls of the chamber extending transversely of the said supporting wall, a clutch bar extending across the chamber with its end portions in said guideways, spring means yieldingly holding said bar in spaced relation to said supporting wall, and means for adjusting the bar forcibly along the guideways in opposition to said spring means for engagement with a shoulder on the shank of a broach in the chamber.

5. A pull head for a broaching machine having a chamber open at one end to receive a broach shank, said chamber having a wall which supports one side of said shank, guideways in adjacent side walls of the chamber extending transversely of the said supporting wall, a clutch bar extending across the chamber with its end portions in said guideways, spring means yieldingly holding said bar in spaced relation to said supporting wall, the face of the bar opposing said supporting wall of the chamber being adapted for engaging a shoulder on the broach shank, and a slide member movable in the pull head and provided with an inclined cam face engageable with the opposite side of the bar for adjusting it forcibly toward said supporting wall of the chamber to engage the shank of a broach therein.

6. A pull head for a broaching machine having a chamber open at one end to receive a broach shank, guideways in opposite side walls of the chamber extending transversely thereof, a clutch bar extending across the chamber with its end portions in said guideways, a slide movable in the pull head adjacent said bar, a cam block removably attached to said slide and having an inclined face engageable with the bar to shift said bar along the guideways for engaging a shoulder on a broach shank in the chamber, and a substitute cam block of different depth attachable to the slide for shifting the clutch bar through a different range of movement in the guideways to engage a shoulder on a different broach shank.

7. A pull head for a broaching machine having a chamber with at least one flat wall to support a broach shank and open at one end to receive said shank, a clutch bar extending transversely of the chamber opposite said flat wall, means on the pull head to forcibly adjust said bar toward said flat wall for engagement with a shouldered shank of a broach, and a shim plate removably disposable on said flat wall of the chamber to support a different broach shank in position for engagement by said clutch bar.

8. A pull head for a broaching machine having a chamber open at one end to receive the shank of a broach, said chamber having a fixed wall, a clutch member disposed opposite said fixed wall in spaced relation thereto, means to forcibly adjust said clutch member toward said wall for engagement with one side of a broach shank, and a shim plate removably disposable against said fixed wall of the chamber, said plate having a channel facing said clutch member to cradle the opposite side of the broach shank.

9. A pull head for a broaching machine having a chamber open at one end to receive a broach shank, said chamber having a fixed wall, a clutch member disposed opposite said fixed wall in spaced relation thereto, means to adjust said clutch member toward said wall for engagement with one side of a broach shank, and gate means on the head at said open end of the chamber and adjustable to vary the width of the opening to fit a broach shank to be entered therein.

10. A pull head for a broaching machine having a chamber with at least one flat wall to support one side of the shank of a broach, said chamber being open at one end to receive the shank, a clutch member disposed opposite said flat wall in spaced relation thereto, means to adjust said clutch member toward said wall for engagement with one side of a broach shank, and gate means on the pull head at said open end of the chamber defining two sides of the opening adjacent said flat wall and adjustable toward and from each other to vary the width of said opening.

11. A pull head for a broaching machine having a chamber open at one end to receive a broach shank, said chamber having a fixed wall, a clutch member disposed opposite said fixed wall in spaced relation thereto, means to adjust said clutch member toward said wall for engagement with one side of a broach shank, and a pair of gate members mounted on the head at said open end and slidably adjustable toward and from each other to vary the width of the opening, together with means for securing them at any desired position of such adjustment.

12. A pull head for a broaching machine having a chamber open at one end to receive a broach shank, said chamber having a fixed wall, a clutch bar guided for movement toward and from said wall, spring means supporting said bar yieldingly in spaced relation to said wall, a slide movable longitudinally in the pull head provided with a cam face operable to force the bar toward said wall into clutching engagement with a broach shank, and a tappet extending from said slide engageable with a fixed portion of the machine at one end of the stroke and operable to shift the slide longitudinally in the pull head in a direction to release the clutch bar from its cam for releasing the broach shank from the clutch bar.

13. A pull head for a broaching machine having a chamber of rectangular cross-section open at one end to receive a broach shank, guideways in the opposite side walls of the chamber extending transversely thereof, a clutch bar extending across the chamber with its end portions in said guideways, spring means upholding said clutch bar yieldingly in spaced relation to an opposite wall of the chamber, a slide movable longitudinally in the pull head provided with an inclined cam face operable against said bar to shift the bar toward said opposite wall into clutching engagement with the broach shank, a spring pocketed in the pull head normally urging said slide in the direction to so shift the clutch bar, and a handle on the slide operable for moving it in the opposite direction to permit the aforesaid springs to shift the bar to release position.

14. In combination with a broach having a shank with a transverse shoulder at only one side of said shank, a pull head having a chamber open at one end to receive said shank, said pull head providing a part engageable with said shoulder of the shank and an oppositely disposed part to engage the opposite side of the shank, one of said parts being fixed, and positive means for adjusting the other of said parts toward and from the fixed part for holding engagement with the shank.

15. In combination with a broach having a shank with a transverse shoulder at one side of said shank, a pull head having a chamber open at one end to receive said shank, said pull head providing a part engageable with said shoulder of the shank and an oppositely disposed part to engage the opposite side of the shank, together with yielding means normally separating said parts sufficiently for insertion of the shank between them, and means for adjusting one of said parts toward the other for operative driving engagement with the shouldered shank of the broach.

16. A pull head for a broaching machine having a chamber with at least one flat wall to support a broach shank and open at one end to receive said shank, a clutch bar extending transversely of the chamber opposite said flat wall, means on the pull head to forcibly adjust said bar toward said flat wall for engagement with a shouldered shank of a broach, a set of shim plates each disposable on said flat wall of the chamber to support a broach shank therein, the pull head having a hole extending through its said flat wall with a bolt to fit therein, each shim plate having a threaded hole engageable with said bolt and a clearance opening dimensioned to pass the bolt, whereby one or more shim plates of the set may be secured in the chamber by the bolt against said flat wall with the remaining plate or plates of the set carried on the bolt between its head and the outer face of said wall, said bolt extending through the clearance openings of all but one plate of the set.

17. A pull head for a broaching machine having a chamber with at least one flat wall to support a broach shank and open at one end to receive said shank, a clutch bar extending transversely of the chamber opposite said flat wall, means on the pull head to forcibly adjust said bar toward said flat wall for engagement with a shouldered shank of a broach, a set of shim plates each of different thickness and disposable on said flat wall of the chamber to support a broach shank therein, the pull head having a pair of holes extending through its said flat wall with bolts to fit therein, each shim plate having a pair of threaded holes engageable with said bolts and a pair of clearance openings dimensioned to pass the bolts, whereby one or more shim plates of the set may be secured in the chamber by the bolts against said flat wall with the remaining plate or plates of the set carried on the bolts between their heads and the outer face of said wall, said bolts extending through the clearance openings of all but the uppermost plate of the set.

18. A pull head for a broaching machine having a chamber with at least one flat wall to support a broach shank and open at one end to receive said shank, a clutch bar extending transversely of the chamber opposite said flat wall, means on the pull head to forcibly adjust said bar toward said flat wall for engagement with a shouldered shank of a broach, a set of shim plates each disposable on said flat wall of the chamber to support a broach shank therein, the pull head having a hole extending through its said flat wall with a bolt to fit therein and long enough to extend through said wall and through all the shim plates of the set, whereby one or more shim plates of the set may be secured in the chamber of the pull head by said bolt extending through said wall of the chamber with the remaining plate or plates of the set carried on the bolt outside the chamber.

19. In combination with a broach having a shank formed with a flat side and with a transverse shoulder at the side of the shank opposite said flat side, a pull head having a chamber with a flat wall and open at one end to receive said shank with its flat side engaging said flat wall, a clutch member movable in the chamber toward and from said flat wall and means on the pull head for adjusting said clutch member positively toward said wall into position for engagement with said shoulder of the shank.

20. In combination with a broach having a shank with a transverse shoulder at only one side of said shank, a pull head having a chamber open at one end to receive said shank, said pull head including a clutch member movable into engagement with said shoulder and an oppositely disposed fixed part engageable with the opposite side of said shank, and means for positively adjusting said clutch member into holding engagement with said shoulder.

FRANCIS J. LAPOINTE.